April 12, 1927.

B. SALE

NUT LOCK

Filed Aug. 7, 1926

1,624,764

Burt Sale, INVENTOR

BY Victor J. Evans

ATTORNEY

WITNESS:

Patented Apr. 12, 1927.

1,624,764

UNITED STATES PATENT OFFICE.

BURT SALE, OF RIVERSIDE, CALIFORNIA.

NUT LOCK.

Application filed August 7, 1926. Serial No. 127,884.

The object of this invention is the provision of a simple means for effectively holding a nut locked on a bolt.

An object is the provision of a nut locking means, in which a nut screwed on a bolt, is formed with openings for the reception therein of headed and pointed pins, the heads of which pins are designed for contacting engagement with a cap nut which is screwed on the main nut, and by virtue of such contact the pointed ends of the pins will engage with and distort the threads of the bolt so that the nut cannot be accidentally unscrewed from the bolt, there being means for holding the cap nut on the main nut.

To the attainment of the foregoing, the improvement resides in the construction, combination and operative association of parts such as is disclosed by the drawings which accompany and form part of this application.

Figure 1:
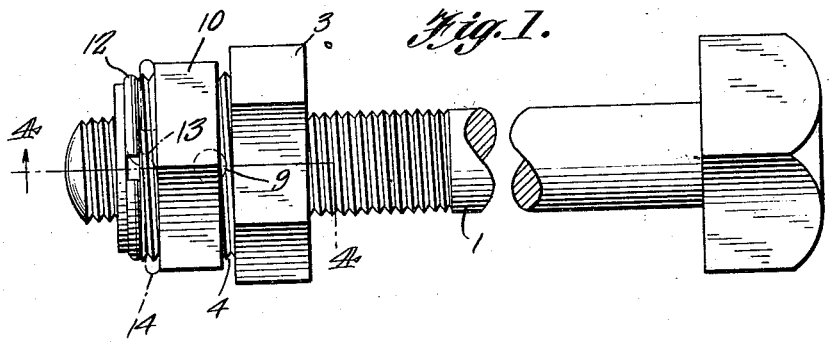
Figure 1 is a plan view of a nut and bolt locked together in accordance with this invention.
Figure 2:
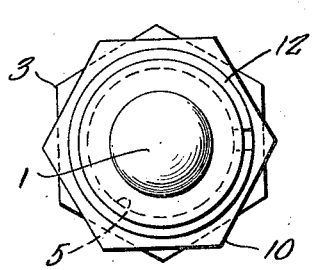
Figure 2 is an end view thereof.
Figure 3:
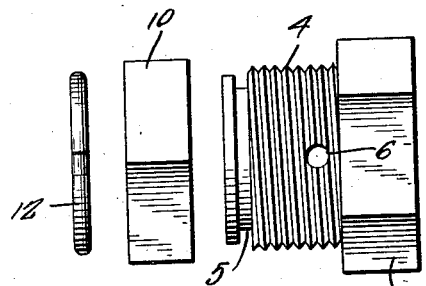
Figure 3 is a side elevation illustrating the main elements of the improvement disassociated.
Figure 4:
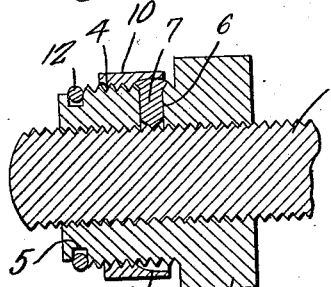
Figure 4 is a detail sectional view approximately on the line 4—4 of Figure 1.
Figure 5:
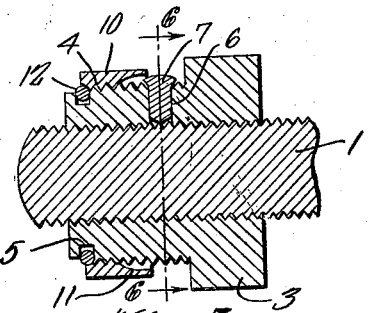
Figure 5 is a view similar to Figure 4 but showing the cap nut screwed off the headed pins.
Figure 6:
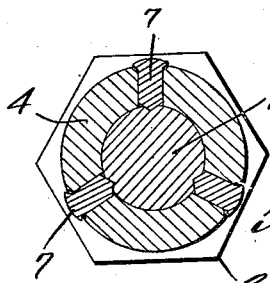
Figure 6 is a sectional view approximately on the line 6—6 of Figure 1.
Figure 7:
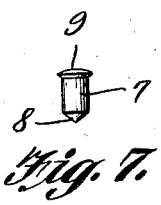
Figure 7 is a plan view of one of the pins.

Referring now to the drawings in detail, the numeral 1 designates the threaded shank of a bolt. Screwed on this shank there is a nut 2. In the showing of the drawings, the nut includes a headed portion 3 having a shank extension which is exteriorly threaded and which is indicated by the numeral 4. The shank 4 has its outer end provided with an annular groove 5, and the said shank, adjacent to the head 3 thereof, is provided with radially disposed equidistantly spaced openings that, of course, communicate with its threaded bore. Designed to be received in each of the openings 6 of the exterior threaded portion of the nut 3 there is a pin 7. The pin has one of its ends pointed, as at 8, and its opposite end headed, as at 9. Screwed on the threaded shank 4 of the nut 3 there is a member which I will term a cap nut and which is indicated by the numeral 10. The cap nut has its outer face cut angularly to provide wrench holes and its inner face is flared, as at 11, inwardly to its threaded bore. The flared portion 11 is designed to receive therein the rounded head 9 of the pin 7, and when the cap nut 10 is screwed by a wrench over the threads 4 of the nut 3 the flared or concaved wall 11 contacting with the heads of the pins 7 will force the pointed ends 8 thereof into biting engagement with the threads on the nut 10, distorting such threads so that the accidental or free turning of the nut 2 on the bolt 1 in either direction will be thus prevented.

In order to associate the cap nut 10 with the nut 2 I arrange in the groove 5 a split ring member 12. If desired, and as disclosed by the dotted lines in Figure 1 of the drawings, one end of the split ring 12 may be offset, as at 13, and from thence continued to provide an inner and enlarged convolution 14 and this convolution may contact with the outer end of the cap nut 10 and hold the same over and in contacting engagement with the heads 9 of the pins 7.

While I have illustrated a satisfactory embodiment of my improved device my features of invention are capable of extended application and I do not wish to be limited to the specific structure herein shown and described.

Having described the invention, I claim:—

1. The combination, a bolt, a nut screwed thereon, said nut having an outer threaded portion provided with a series of radially disposed openings that communicate with its bore and having an annular depression at its outer end, pins, each of which having an inner pointed end and an outer headed end, one of which being received in each of the mentioned openings, a cap nut screwed on the exteriorly threaded portion of the first mentioned nut having its bore flared at one end, for frictional contact with the heads of the pins for forcing said pins through the openings to cause the pointed ends thereof to bite and distort the threads of the bolt and a ring member seated in the groove of the first mentioned nut for holding the cap nut thereon.

2. The combination, a bolt, a nut screwed thereon, said nut having an outer threaded portion provided with a series of radially disposed openings that communicate with its bore, pins, each of which having an inner pointed end and an outer headed end, one of which being received in each of the mentioned openings, and a cap nut screwed on the exteriorly threaded portion of the first mentioned nut having its bore flared at one end, for frictional contact with the heads of the pins for forcing said pins through the openings to cause the pointed ends thereof to bite and distort the threads of the bolt.

In testimony whereof I affix my signature.

BURT SALE.